(12) United States Patent
Lee

(10) Patent No.: US 10,224,197 B2
(45) Date of Patent: Mar. 5, 2019

(54) ELECTRODELESS LAMP

(71) Applicant: Yun-Cheng Lee, New Taipei (TW)

(72) Inventor: Yun-Cheng Lee, New Taipei (TW)

( * ) Notice: Subject to any disclaimer, the term of this patent is extended or adjusted under 35 U.S.C. 154(b) by 0 days.

(21) Appl. No.: 15/223,987

(22) Filed: Jul. 29, 2016

(65) Prior Publication Data
US 2017/0170002 A1   Jun. 15, 2017

(30) Foreign Application Priority Data

Dec. 11, 2015  (TW) .............................. 104141688 A
Mar. 15, 2016  (TW) .............................. 105107902 A

(51) Int. Cl.
| | | |
|---|---|---|
| H01J 61/18 | (2006.01) |
| H01J 65/04 | (2006.01) |
| C09K 11/75 | (2006.01) |
| C09K 11/77 | (2006.01) |
| C09K 11/62 | (2006.01) |
| C09K 11/60 | (2006.01) |
| H01J 61/30 | (2006.01) |

(52) U.S. Cl.
CPC ............ *H01J 65/044* (2013.01); *C09K 11/60* (2013.01); *C09K 11/626* (2013.01); *C09K 11/75* (2013.01); *C09K 11/755* (2013.01); *C09K 11/7704* (2013.01); *H01J 61/18* (2013.01); *H01J 61/30* (2013.01)

(58) Field of Classification Search
CPC combination set(s) only.
See application file for complete search history.

(56) References Cited

U.S. PATENT DOCUMENTS

| | | |
|---|---|---|
| 5,404,076 A | 4/1995 | Dolan et al. |
| 5,606,220 A | 2/1997 | Dolan et al. |
| 5,866,980 A | 2/1999 | Dolan et al. |
| 5,866,981 A | 2/1999 | Saimi et al. |
| 6,469,444 B1 | 10/2002 | Leng et al. |
| 6,633,111 B1 | 10/2003 | Kim et al. |
| 2010/0117533 A1 | 5/2010 | Koerber et al. |

FOREIGN PATENT DOCUMENTS

| | | |
|---|---|---|
| CN | 101536144 A | 9/2009 |
| CN | 103065922 A | 4/2013 |
| CN | 103608895 A | 2/2014 |
| TW | 406280 B | 9/2000 |
| TW | 201015615 A | 4/2010 |

OTHER PUBLICATIONS

TIPO, Office Action dated Feb. 18, 2017 in corresponding TW patent application No. 105107902, 4 pages with English summary of the office action.
SIPO, Office Action dated Jan. 2, 2018 in corresponding CN patent application No. 201610395576.1, 8 pages with English summary of the office action.

*Primary Examiner* — Douglas W Owens
*Assistant Examiner* — Jianzi Chen
(74) *Attorney, Agent, or Firm* — Masuvalley & Partners

(57) ABSTRACT

An electrodeless lamp driven by a microwave generator is disclosed. The electrodeless lamp includes a first infill composed of mercury-free metal halide and provides a continuous full spectrum radiation including ultraviolet ray, visible light, and infrared ray. Thereby, the electrodeless lamp, which meets the standard of AM 1.5 G, has advantages of environmental friendliness, high efficacy lighting, long service life, and low light decay, and therefore, have become applicable in the field of solar simulators.

7 Claims, 3 Drawing Sheets

ELECTRODELESS LAMP

This application claims priority to Taiwan Patent Application No. 104141688 filed on Dec. 11, 2015 and Taiwan Patent Application No. 105107902 filed on Mar. 15, 2016.

CROSS-REFERENCES TO RELATED APPLICATIONS

Not applicable.

BACKGROUND OF THE INVENTION

Field of the Invention

The present invention provides an electrodeless lamp, and particularly, to an electrodeless lamp capable of providing a continuous full spectrum radiation.

Descriptions of the Related Art

In conventional gas discharge lamp technologies, such as high-pressure mercury lamps, low-pressure mercury lamps, short-arc xenon lamps, long-arc xenon lamps, metal halide lamps, and high-intensity discharge (HID) lamps, light spectrums of different bands and proportions are provided by filling the lamp bodies with various gases or additives and using electrodes to excite the filling substances.

However, because the filling substances have different aging properties, the high temperature generated during long usage time and operation tends to initiate chemical reactions between the electrodes and the additives, and this may cause a change in the spectrum of the gas discharge lamps and intensity attenuation. Furthermore, for lamps adopting the aforesaid gas discharge lamp technologies, an external filter is often disposed to adjust the spectrum output, but disposition of the external filter degrades the light emission efficacy of the overall lamp source. In addition, the filter sheet tends to age due to long exposure to light radiation.

To overcome the aforesaid shortcoming, electrodeless lamps (also termed plasma lamps) have appeared. The electrodeless lamp, which is also a kind of gas discharge lamp, provides a light source by filling a sealed and transparent lamp body thereof with a chemically inert gas and one or more active components (e.g., mercury, sulfur, selenium, tellurium or metal halides) and exciting the filling substances by use of radio frequency (RF) or microwave energies.

The electrodeless lamp has a service life of up to about 40,000 to 90,000 hours which is much longer than that of currently known light emitters (including LEDs), and is capable of maintaining consistent spectrum properties even after a long time of use; moreover, the color rendering index (CRI>95) of the spectrum of the electrodeless lamp is the most similar to that of the sunlight among all currently existing light emitters.

Since the 1970s, the development of electrodeless microwave sulfur lamps has been initiated by experts such as Childs et al. The microwave sulfur lamp is a kind of full-spectrum electrodeless lamp driven by a microwave generator. A quartz bulb housing of the microwave sulfur lamp is filled with sulfur, and microwave radiation of 2,450 MHz is provided to excite the sulfur and heat the sulfur into the plasma state at an extremely high temperature, thereby, generating a continuous spectrum. The microwave sulfur lamp has the following advantages: high efficacy lighting, long service life, continuous spectrum, mercury-free, good luminous maintenance rate, and instant activation or the like. About 73% of the light emitted by the microwave sulfur lamp falls within the visible spectrum while the harmful ultraviolet rays only account for less than 1% of the light.

The related art of the electrodeless lamps has been disclosed in many patent documents, e.g., U.S. patents U.S. Pat. No. 5,404,076, U.S. Pat. No. 5,866,980A, U.S. Pat. No. 6,469,444B1, U.S. Pat. No. 5,606,220A, U.S. Pat. No. 5,866,981A, U.S. Pat. No. 6,633,111B1, and US 2010/0117533A1. However, most of the patent documents place an emphasis on adjusting the species and conditions of the filling substances so that the spectrum range, light emitting efficiency, and color rendering performance of the lamps are more suitable for application in general lighting.

In the industry, solar simulators are widely used in the performance evaluation of photovoltaic cells. The solar simulator provides, through the design of an optical system, a light source with properties consistent with those of natural sunlight received on the surface of the earth, thereby, ensuring accurate and reproducible test results.

In order to integrate and specify spectrum properties and the measurement of the solar simulator, standards such as IEC 60904-9, ASTM E927-10, JIS C 8912, CNS 13059-9 and test specifications for photoelectric elements such as IEC 61215 and IEC 61646 have been established internationally. According to these specifications, the measurement of a standard photovoltaic cell shall be performed with an incident light source with an intensity of 100 mW/cm$^2$ and meeting the AM 1.5 G standard.

As shown in FIG. 1, in the related art, the light emission spectrum distribution of the current sulfur lamp used in general lighting is relatively narrow. The light emitted mainly falls within the visible light spectrum range, and the proportions of the light falling within the ultraviolet light spectrum and the infrared light spectrum are all relatively low, so it does not meet the aforesaid specification. Therefore, improvements with different combinations of (xenon) discharge lamps and halide lamps are often used as the standard light source of the solar simulator. Additionally, an appropriate filter may also be disposed to calibrate the emitted light spectrum.

As described in U.S. patents U.S. Pat. No. 5,866,980A and U.S. Pat. No. 6,469,444B1, although the spectrum performance of the sulfur lamp can be modified by adding a tiny amount of metal halides into the sulfur lamp, excessive metal halides tend to chemically react with sulfur, and this makes the sulfur lamp hard to activate or lit repeatedly. Therefore, there is a limit to the added amount of metal halides which increases the spectrum ranges of the ultraviolet and infrared light.

Accordingly, it is important to provide an electrodeless lamp which can generate a continuous full spectrum radiation and meet the AM 1.5 G standard to overcome the aforesaid drawback.

SUMMARY OF THE INVENTION

An objective of the present invention is to provide an electrodeless lamp. The spectrum of the light emitted by the electrodeless lamp may be concentrated in the range of 350 nm to 1,100 nm to cover the ultraviolet light spectrum, the visible light spectrum, and the infrared light spectrum. The electrodeless lamp can be used as the standard light source of a solar simulator with advantages of a long service life, extremely low light decay or the like.

The first feature of the present invention lies in that the main filling substance of the electrodeless lamp is an active metal bromide instead of sulfur. This improved electrodeless lamp can avoid the shortcoming in the spectrum performance of the microwave sulfur lamp and achieve a wider and more stable spectrum distribution. The main filling substance of the present invention is metal bromide, i.e., indium bromide, antimony tribromide ($SbBr_3$), cobalt bromide ($CoBr_2$) and magnesium bromide ($MgBr_2$), or a mixture of these metal bromides. When the outer diameter of the bulb is 3.5 cm, the total weight of the added metal bromides may be in the range of 16 mg to 40 mg, i.e., the added metal bromides may be in a concentration range from 0.93 mg/cm$^3$ to 2.33 mg/cm$^3$. Thus, there are still great differences in performance between the metal bromides and the metal iodides commonly used in halide lamps generally with two opposite electrodes or used in a plurality of metal discharge lamps.

The second feature of the present invention lies in that a small amount of metal antimony may also be added into the bulb of the electrodeless lamp. The addition of the metal antimony will facilitate the rapid activation of the microwave electrodeless lamp and may reduce the time required for reactivation of the lamp after the lamp is turned off and cooled. In the related art, sometimes metal indium is used, but the metal antimony added herein is mainly composed of antimony bromide. The metal antimony may take part in the high-temperature plasma reaction when the bulb is emitting light, and will be precipitated on the inner wall of the quartz bulb due to oversaturation when the bulb is cooled, and thus, the undesirable chemical reaction will not occur.

The third feature of the present invention lies in that a small amount of rare earth metal halides or a tiny amount of transition metal halides may also be added into the bulb of the electrodeless lamp. The added rare earth metal halides are composed of a mixture of one or more rare earth metal halides. The rare earth metal is for example dysprosium (Dy), holmium (Ho), and/or caesium (Cs). The addition of the small amount of rare earth metal halides also facilitates the rapid activation of the microwave electrodeless lamp, improves the light emission efficiency and the color rendering performance, and overcomes the drawback in the related art that the bulb cannot be reactivated with heat accumulated therein. The improved electrodeless lamp can have the advantage of being rapidly reactivated 30 seconds after it is turned off.

To achieve the aforesaid objective, an electrodeless lamp driven by a microwave generator according to the present invention comprises an electromagnetic housing, a bulb, a conductive mesh, and a magnetron. The electromagnetic housing has a microwave-providing cavity, the bulb is positioned on the microwave-providing cavity of the electromagnetic housing by a lamp body, the conductive mesh surrounds the bulb, and the magnetron may transmit the generated microwave to the microwave-providing cavity by a waveguide. The bulb is filled with a filler with mercury-free metal halide, and the filler is composed of a first infill, second infill, third infill, and fourth infill.

To achieve the aforesaid objective, the first infill of the electrodeless lamp of the present invention is composed of a first compound composition of indium bromide and antimony bromide, the second infill is composed of a second compound composition of active metallic element(s), the third infill is composed of a third compound composition of one or more rare earth metal halide(s), and the fourth infill is composed of a fourth compound composition of noble gas.

To achieve the aforesaid objective, the first compound composition of the electrodeless lamp of the present invention includes antimony tribromide ($SbBr_3$), cobalt bromide ($CoBr_2$), and/or magnesium bromide ($MgBr_2$).

To achieve the aforesaid objective, the second compound composition of the electrodeless lamp of the present invention includes antimony (Sb).

To achieve the aforesaid objective, the third compound composition of the electrodeless lamp of the present invention includes dysprosium (Dy), holmium (Ho), and/or caesium (Cs).

To achieve the aforesaid objective, the fourth compound composition of the electrodeless lamp of the present invention includes helium (He), neon (Ne), argon (Ar), and/or xenon (Xe).

To achieve the aforesaid objective, the concentration of the first infill, the second infill, and the third infill of the electrodeless lamp of the present invention is between 0.6-2.9 mg/cm$^3$.

To achieve the aforesaid objective, the concentration of the first infill, the second infill, and the third infill of the electrodeless lamp of the present invention is between 0.9-2.3 mg/cm$^3$.

To achieve the aforesaid objective, the electrodeless lamp of the present invention further comprises a bulb housing composed of a transparent quartz.

To achieve the aforesaid objective, the light emitted by the bulb of the electrodeless lamp of the present invention is a continuous full spectrum radiation including ultraviolet ray, visible light, and infrared ray.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
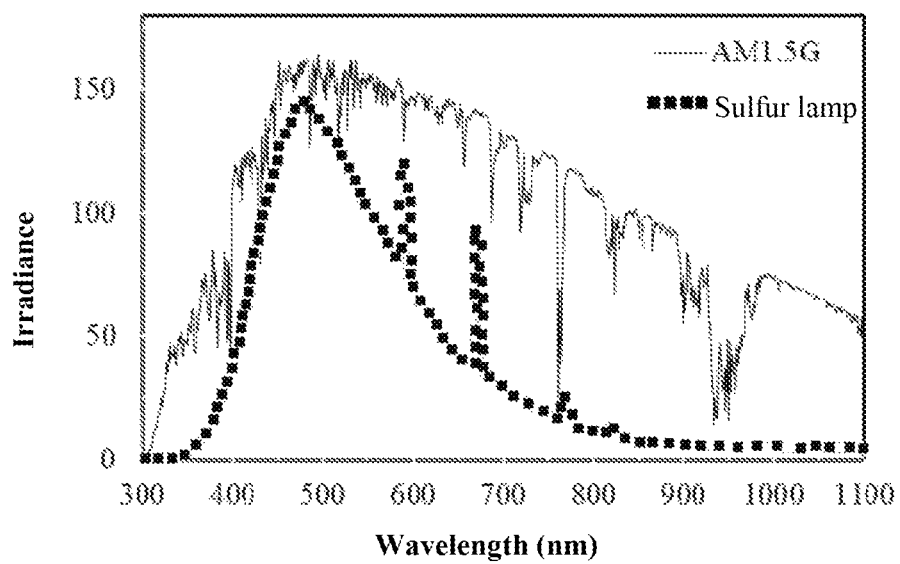
FIG. 1 is a graph illustrating the comparison between the continuous spectrum of a microwave sulfur lamp of the related art and the spectrum meeting the AM 1.5 G standard.
Figure 2:
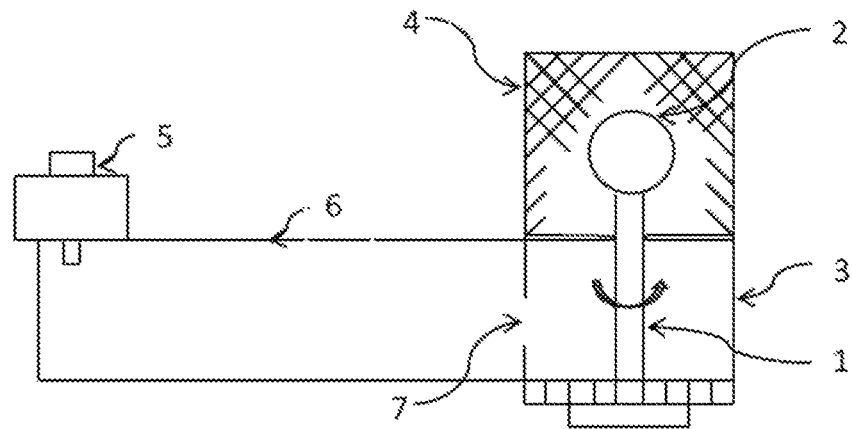
FIG. 2 is a schematic view of a microwave generator and an electrodeless lamp base used in the present invention.

FIG. 2 is a schematic view of an electrodeless lamp 10 of the present invention. The electrodeless lamp 10 of the present invention comprises a lamp body 1, a bulb 2, an electromagnetic housing 3, a conductive mesh 4, a magnetron 5 and a waveguide 6. The electromagnetic housing 3 has a microwave-providing cavity 7. The bulb 2 is positioned on the microwave-providing cavity 7 of the electromagnetic housing 3 by the lamp body 1. The conductive mesh 4 surrounds the bulb 2. The magnetron 5 may transmit the generated microwave to the microwave-providing cavity 7 by the waveguide 6.

Accordingly, the bulb 2 is sealed after it is filled with a filler with mercury-free metal halide which is composed of a first infill, a second infill, a third infill, and a fourth infill.

The magnetron 5 provides a microwave with a frequency of 2.45 GHz and a power of 1 kW. Then, the microwave is transmitted to the microwave-providing cavity 7 via the waveguide 6. Meanwhile, the microwave energy is concentrated by the electromagnetic housing 3 to heat the filler within the bulb 2 and to excite the filler into the plasma status to generate the spectrum radiation. After the light rays are output from the bulb 2 through holes of the conductive mesh 4, the continuous radiation of full spectrum meeting the AM 1.5 G standard can be obtained.

In the present invention, to bear the high temperature (about 600° C.-900° C.) generated during the operation of the electrodeless lamp 10, the bulb housing of the bulb 2 of the electrodeless lamp 10 is made of quartz. Additionally, depending on the required power, the size of the bulb 2 is usually 10 $cm^3$-30 $cm^3$, and the filler inside the bulb 2 generally ranges from 10 mbar to 100 mbar.

Next, the filler inside the electrodeless lamp 10 of the present invention will be described in detail. As compared to the conventional electrodeless lamp, the electrodeless lamp 10 of the present invention mainly has three technical features.

First, the first feature of the present invention lies in that the main filling substance of the electrodeless lamp 10 is active metal bromide instead of sulfur. This improved electrodeless lamp can avoid the shortcoming in spectrum performance of the microwave sulfur lamp and achieve a wider and more stable spectrum distribution. The main filling substance of the present invention is metal bromide, i.e., indium bromide, antimony tribromide ($SbBr_3$), cobalt bromide ($CoBr_2$) and magnesium bromide ($MgBr_2$), or a mixture of these metal bromides.

When the outer diameter of the bulb 2 is 3.5 cm, the total weight of the added metal bromides may be in the range of 16 mg to 40 mg, i.e., the added metal bromides may be in a concentration range from 0.93 $mg/cm^3$ to 2.33 $mg/cm^3$. Thus, there are still great differences in performance between the metal bromides and the metal iodides commonly used in halide lamps with two opposite electrodes or used in a plurality of metal discharge lamps.

Furthermore, the second feature of the present invention lies in that a small amount of active metallic element antimony (Sb) may also be added into the bulb 2 of the electrodeless lamp 10. The addition of Sb will facilitate the rapid activation of the electrodeless lamp 10 and reduce the time required for reactivation of the lamp after the lamp is turned off and cooled. In the related art, sometimes indium (In) is added to achieve the same effect, but the infill of the present invention is mainly composed of antimony bromide. The added Sb may take part in the high-temperature plasma reaction during the operation of the lamp, and will precipitate on the inner wall of the quartz bulb due to oversaturation when the bulb is cooled, and thus, other undesirable chemical reactions can be avoided.

Moreover, the third feature of the present invention lies in that a small amount of rare earth metal halides or transition metal halides may be further added into the bulb 2 of the electrodeless lamp 10. The rare earth metal halides are composed of a mixture of at least one rare earth metal halide. The rare earth metal includes dysprosium (Dy), holmium (Ho), and/or caesium (Cs). The addition of the rare earth metal halides also facilitates the rapid reactivation of the electrodeless lamp (within 30 seconds) after the electrodeless lamp is turned off to overcome the drawback in the related art that the bulb with heat accumulated therein cannot be reactivated. Meanwhile, the light emission efficiency and the color rendering performance of the lamp is improved.

With the aforesaid features, the electrodeless lamp 10 of the present invention has of long service life and extremely low light decay or the like. Moreover, as compared to the conventional lighting application, the spectrum of the light emitted by the electrodeless lamp 10 of the present invention is stable, continuous and wide. The range of the spectrum may further cover ultraviolet light (between 350 nm and 400 nm), visible light and infrared light (between 700 nm and 1,100 nm), and the spectrum distribution thereof is consistent with that of the natural sunlight, so the electrodeless lamp 10 can be used as the standard light source of the solar simulator meeting the AM 1.5 G standard.

In a preferred embodiment of the present invention, the first infill of the electrodeless lamp 10 is composed of a first compound composition of indium bromide and antimony bromide, the second infill is composed of a second compound composition of active metallic element(s), the third infill is composed of a third compound composition of one or more rare earth metal halide(s), and the fourth infill is composed of a fourth compound composition of noble gas.

The first compound composition includes antimony tribromide ($SbBr_3$), cobalt bromide ($CoBr_2$), and/or magnesium bromide ($MgBr_2$); the second compound composition includes antimony (Sb) and/or indium (In); the third compound composition includes dysprosium (Dy), holmium (Ho), and/or caesium (Cs); and the fourth compound composition includes helium (He), neon (Ne), argon (Ar), and/or xenon (Xe).

Specifically, the concentration of the active compound composition (i.e., the collection of the first compound composition, the second compound composition, and the third compound composition) filling in the bulb 2 is between 0.6-2.9 $mg/cm^3$, and preferably between 0.9-2.3 $mg/cm^3$. Furthermore, the filler (especially the mercury-free metal halide in the first infill and the rare earth metal halide in the third infill) added into the electrodeless lamp 10 can control the spectrum range and the energy property of the electrodeless lamp 10 by changing the species and the concentration of the filler.

Hereinafter, technical contents of embodiments of present invention will be described in detail.

In the first embodiment of the present invention, an electrodeless lamp 10 is provided. The electrodeless lamp 10 has a spherical bulb housing made of quartz with an outer diameter of 3.5 cm, the volume inside the bulb is 17.16 $cm^3$, and the fillers inside the bulb are listed as follows:

1. Indium bromide (InBr): 7 mg
2. Antimony tribromide ($SbBr_3$): 22 mg
3. Antimony (Sb): 6 mg
4. Dysprosium triiodide ($DyI_3$): 0.3 mg
5. Xenon (Xe): 30 torr at 25° C.

Figure 3:
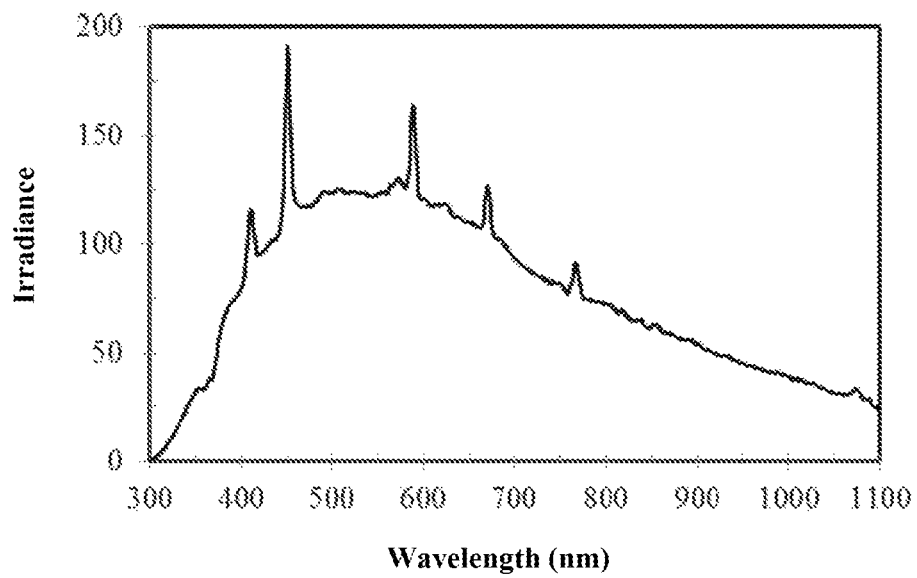
FIG. 3 is a continuous spectrum diagram of an electrodeless lamp according to the first embodiment of the present invention.

The total weight of InBr, $SbBr_3$, Sb and $DyI_3$ filling the bulb 2 of the electrodeless lamp 10 in the first embodiment is 35.3 mg, i.e., the concentration of the first infill, the second infill and the third infill is 2.06 $mg/cm^3$. After the fourth infill (Xe) is added into the bulb 2 and then the bulb 2 is sealed, the bulb 2 is inserted into the structure as shown in FIG. 2 and is rotated at a rotational speed of 1,200 rpm to 3,000 rpm. Then, under the condition of 2.45 GHz and 1,000 W, the emission spectrum as shown in FIG. 3 can be obtained.

Thereafter, a spectro-color analyzer and a sun spectroradiometer are adopted to measure the emission spectrum of the electrodeless lamp 10 excited by the microwave, and a relative color temperature of 5,233 K can be obtained. Results of the spectrum distribution between 400 nm and 1,100 nm are as shown in Table 1 and FIG. 3, and the results meet requirements of the A-grade light source of the solar simulator in the IEC 60904-9 (and JIS C 8912) specification. As can be known from this, these species of fillers of the electrodeless lamp 10 at the aforesaid proportions provide an ideal continuous radiation of full frequency spectrum and provide good lighting efficacy.

TABLE 1

Spectrum Distribution Comparison between the IEC 60904-9 Specification and the Electrodeless Lamp of the First Embodiment

| Waveband | IEC 60904-9 Specification | | Electrodeless lamp of the first embodiment | |
|---|---|---|---|---|
| | Wavelength range (nm) | Spectrum distribution (%) | Spectrum distribution (%) | Spectrum matching |
| 1 | 400-500 | 18.4 | 18.2 | 0.991 |
| 2 | 500-600 | 19.9 | 21.3 | 1.07 |
| 3 | 600-700 | 18.4 | 19.3 | 1.05 |
| 4 | 700-800 | 14.9 | 14.9 | 1.00 |
| 5 | 800-900 | 12.5 | 11.6 | 0.928 |
| 6 | 900-1,100 | 15.9 | 14.0 | 0.919 |
| | 400-1,100 | 100.0 | 100.0 | Grade A |

Next, in the second embodiment of the present invention, another electrodeless lamp 10 is provided. The electrodeless lamp 10 also has a spherical bulb housing made of quartz with an outer diameter of 3.5 cm, the volume inside the bulb is 17.16 cm$^3$, and the fillers inside the bulb are listed as follows:

1. Indium bromide (InBr): 10 mg
2. Antimony tribromide (SbBr$_3$): 12 mg
3. Antimony (Sb): 3 mg
4. Cobalt iodide (CoI$_2$): 1.0 mg
5. Dysprosium triiodide (DyI$_3$): 0.3 mg
6. Xenon (Xe): 15 torr at 25° C.

Figure 4:
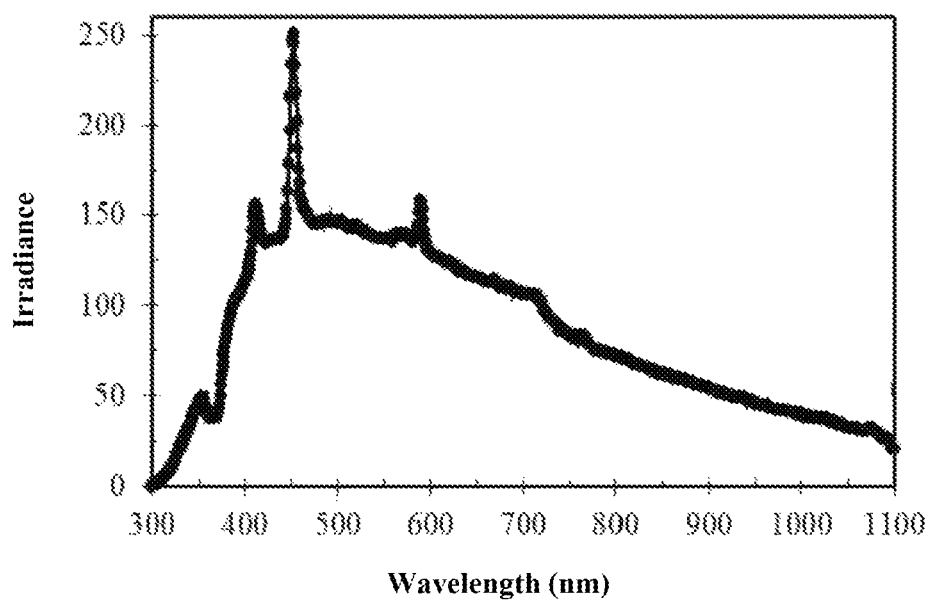
FIG. 4 is a graph illustrating the comparison between the continuous spectrum of an electrodeless lamp according to the second embodiment of the present invention and the solar spectrum meeting the AM 1.5 G standard.

The total weight of InBr, SbBr$_3$, Sb, CoI$_2$ and DyI$_3$ filling the bulb 2 of the electrodeless lamp 10 in the second embodiment is 26.3 mg, i.e., the concentration of the first infill, the second infill and the third infill is 1.54 mg/cm$^3$. Next, after the fourth infill (Xe) is added into the bulb 2 and then the bulb 2 is sealed, the bulb 2 is inserted into the structure as shown in FIG. 2 and is rotated at a rotational speed of 3,000 rpm. Then, under the condition of 2.45 GHz and 1,000 W, the emission spectrum as shown in FIG. 4 can be obtained.

Thereafter, the spectro-color analyzer and the sun spectroradiometer are adopted to measure the emission spectrum of the electrodeless lamp excited by the microwave, and a relative color temperature of 5,900 K can be obtained. Results of spectrum distribution between 350 nm and 750 nm are as shown in Table 2 and FIG. 4. The results meet the requirements of the A-grade light source of the solar simulator required for measurement of amorphous thin film solar cells and modules in the JIS C 8933 specification. As can be known from this, these species of fillers of the electrodeless lamp at the aforesaid proportions provide another ideal continuous radiation of full frequency spectrum and provide good lighting efficacy.

TABLE 2

Spectrum Distribution Comparison between the JIS C 8933 Specification and the Electrodeless Lamp of the Second Embodiment

| Waveband | JIS C 8933 Specification | | Electrodeless lamp of the second embodiment | |
|---|---|---|---|---|
| | Wavelength range (nm) | Spectrum distribution (%) | Spectrum distribution (%) | Spectrum matching |
| 1 | 350-400 | 6.2 | 7.1 | 1.140 |
| 2 | 400-450 | 11.8 | 14.5 | 1.230 |
| 3 | 450-500 | 14.9 | 16.4 | 1.100 |
| 4 | 500-550 | 14.6 | 14.4 | 0.987 |
| 5 | 550-600 | 14.3 | 14.1 | 0.986 |
| 6 | 600-650 | 13.8 | 12.4 | 0.895 |
| 7 | 650-700 | 12.9 | 11.3 | 0.876 |
| 8 | 700-750 | 11.5 | 9.8 | 0.854 |
| | 350-750 | 100.0 | 100.0 | Grade A |

In the third embodiment of the present invention, another electrodeless lamp 10 is provided. The electrodeless lamp 10 also has a spherical bulb housing made of quartz with an outer diameter of 3.5 cm, the volume inside the bulb is 17.16 cm$^3$, and the fillers inside the bulb are listed as follows:

1. Indium bromide (InBr): 8 mg
2. Antimony tribromide (SbBr$_3$): 21 mg
3. Antimony (Sb): 6 mg
4. Dysprosium triiodide (DyI$_3$): 0.6 mg
5. Xenon+argon (Xe+Ar): 20 torr at 25° C.

Figure 5:
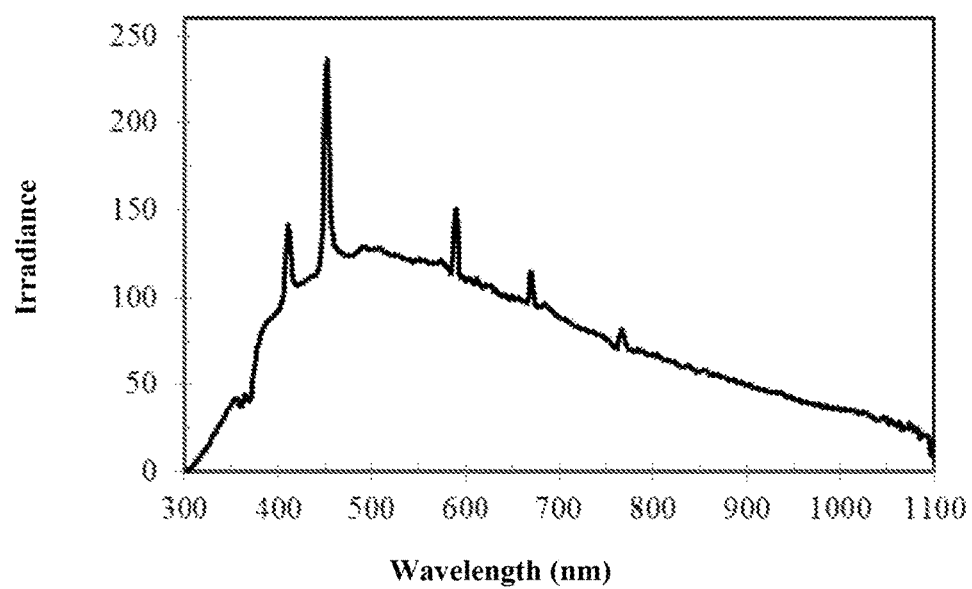
FIG. 5 is a continuous spectrum diagram of an electrodeless lamp according to the third embodiment of the present invention.

The total weight of the InBr, SbBr$_3$, Sb and DyI$_3$ filling the bulb 2 of the electrodeless lamp 10 in the third embodiment is 35.6 mg, i.e., the concentration of the first infill, the second infill and the third infill is 2.07 mg/cm$^3$. After the fourth infill (Xe and Ar) is added into the bulb 2 and then the bulb 2 is sealed, the bulb 2 is inserted into the structure as shown in FIG. 2 and is rotated at a rotational speed of 3,000 rpm. Then, under the condition of 2.45 GHz and 1,000 W, the emission spectrum as shown in FIG. 5 can be obtained.

Thereafter, the spectro-color analyzer and the sun spectroradiometer are adopted to measure the emission spectrum of the electrodeless lamp excited by the microwave, and a relative color temperature of 5,651 K can be obtained. The results of the spectrum distribution between 350 nm and 1,100 nm are as shown in Table 3, Table 4 and FIG. 5. The results meet requirements of the A-grade light source of the solar simulator in the IEC 60904-9 (and JIS C 8912) and JIS C 8933 specifications. As can be known from this, these species of fillers of the electrodeless lamp 10 at the aforesaid proportions provide a broad and continuous radiation of full frequency spectrum and provide good lighting efficacy.

TABLE 3

Spectrum Distribution Comparison between the IEC 60904-9 Specification and the Electrodeless Lamp of the Third Embodiment

| Waveband | IEC 60904-9 Specification | | Electrodeless lamp of the third embodiment | |
|---|---|---|---|---|
| | Wavelength range (nm) | Spectrum distribution (%) | Spectrum distribution (%) | Spectrum matching |
| 1 | 400-500 | 18.4 | 20.6 | 1.12 |
| 2 | 500-600 | 19.9 | 21.9 | 1.10 |
| 3 | 600-700 | 18.4 | 18.8 | 1.02 |
| 4 | 700-800 | 14.9 | 14.3 | 0.961 |
| 5 | 800-900 | 12.5 | 10.9 | 0.868 |
| 6 | 900-1,100 | 15.9 | 13.4 | 0.846 |
| | 400-1,100 | 100.0 | 100.0 | Grade A |

TABLE 4

Spectrum Distribution Comparison between the JIS C 8933 Specification and the Electrodeless Lamp of the Third Embodiment

| | JIS C 8933 Specification | | Electrodeless lamp of the third embodiment | |
|---|---|---|---|---|
| Waveband | Wavelength range (nm) | Spectrum distribution (%) | Spectrum distribution (%) | Spectrum matching |
| 1 | 350-400 | 6.2 | 6.3 | 1.02 |
| 2 | 400-450 | 11.8 | 12.6 | 1.07 |
| 3 | 450-500 | 14.9 | 15.5 | 1.04 |
| 4 | 500-550 | 14.6 | 14.7 | 1.01 |
| 5 | 550-600 | 14.3 | 15.1 | 1.06 |
| 6 | 600-650 | 13.8 | 13.3 | 0.965 |
| 7 | 650-700 | 12.9 | 12.3 | 0.952 |
| 8 | 700-750 | 11.5 | 10.2 | 0.886 |
| | 350-750 | 100.0 | 100.0 | Grade A |

According to the above descriptions, the electrodeless lamp 10 of the present invention can generate spectrum continuous radiation meeting the AM 1.5 G standard to cover the ultraviolet light spectrum, the visible light spectrum, and the infrared light spectrum, and the electrodeless lamp 10 can be further used in the field of solar simulators with advantages of long service life, extremely low light decay or the like.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electrodeless lamp driven by a microwave generator, comprising:
    an electromagnetic housing, which has a microwave-providing cavity;
    a bulb, which is positioned on the microwave-providing cavity of the electromagnetic housing by a lamp body;
    a conductive mesh, which surrounds the bulb; and
    a magnetron, which transmits the generated microwave to the microwave-providing cavity by a waveguide;
    wherein the bulb is filled with a sulfur free filler with mercury-free metal halide, and the filler is composed of a first infill, a second infill, a third infill, and a fourth infill;
    wherein the first infill comprises a first compound composition of indium bromide and antimony bromide, the second infill comprises a second compound composition of active metallic element(s), the third infill comprises a third compound composition of one or more rare earth metal halide(s), the fourth infill comprises a fourth compound composition of noble gas, and the second compound composition includes antimony (Sb);
    wherein the first compound composition includes antimony tribromide ($SbBr_3$), cobalt bromide ($CoBr_2$), and/or magnesium bromide ($MgBr_2$);
    wherein the light emitted by the bulb is a continuous radiation of full spectrum including ultraviolet ray, visible light, and infrared ray,
    wherein a spectrum distribution of ultraviolet ray between a wavelength of 350 nm to 400 nm comprises between 6.3% to 7.1% of emission;
    wherein a spectrum distribution of visible light between a wavelength of 400 nm to 700 nm comprises between 58.8% to 61.3% of emission; and
    wherein a spectrum distribution of infrared ray between a wavelength of 800 nm to 1100 nm comprises between 24.3% to 25.6% of emission.

2. The electrodeless lamp of claim 1, wherein the third compound composition includes dysprosium (Dy), holmium (Ho), and/or caesium (Cs).

3. The electrodeless lamp of claim 1, wherein the fourth compound composition includes helium (He), neon (Ne), argon (Ar), and/or xenon (Xe).

4. The electrodeless lamp of claim 1, wherein the concentration of the first infill, the second infill, and the third infill is between 0.6-2.9 mg/cm3.

5. The electrodeless lamp of claim 1, wherein the concentration of the first infill, the second infill, and the third infill is between 0.9-2.3 mg/cm3.

6. The electrodeless lamp of claim 1, further comprising a bulb housing composed of a transparent quartz.

7. An electrodeless lamp driven by a microwave generator, comprising:
    an electromagnetic housing, which has a microwave-providing cavity;
    a bulb, which is positioned on the microwave-providing cavity of the electromagnetic housing by a lamp body;
    a conductive mesh, which surrounds the bulb; and
    a magnetron, which transmits the generated microwave to the microwave-providing cavity by a waveguide;
    wherein the bulb is filled with a sulfur free filler with mercury-free metal halide, and the filler is composed of a first infill, a second infill, a third infill, and a fourth infill;
    wherein the first infill comprises a first compound composition of indium bromide and antimony bromide, the second infill is composed of a second compound composition of active metallic element(s), the third infill is composed of a third compound composition of one or more rare earth metal halide(s), the fourth infill is composed of a fourth compound composition of noble gas, and the second compound composition includes antimony (Sb);
    wherein the first compound composition includes antimony tribromide ($SbBr_3$), cobalt bromide ($CoBr_2$), and magnesium bromide ($MgBr_2$).

* * * * *